United States Patent
Kim et al.

(10) Patent No.: US 10,613,928 B2
(45) Date of Patent: Apr. 7, 2020

(54) SEMICONDUCTOR DEVICES AND SEMICONDUCTOR SYSTEMS INCLUDING THE SAME

(71) Applicant: SK hynix Inc., Gyeonggi-do (KR)

(72) Inventors: Chang Hyun Kim, Seoul (KR); Yong Mi Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 35 days.

(21) Appl. No.: 16/045,018

(22) Filed: Jul. 25, 2018

(65) Prior Publication Data
US 2019/0188072 A1 Jun. 20, 2019

(30) Foreign Application Priority Data
Dec. 19, 2017 (KR) .................. 10-2017-0175331

(51) Int. Cl.
*G06F 11/10* (2006.01)

(52) U.S. Cl.
CPC .......... *G06F 11/106* (2013.01); *G06F 11/104* (2013.01)

(58) Field of Classification Search
CPC .................. G06F 11/106; G06F 11/104
See application file for complete search history.

(56) References Cited

U.S. PATENT DOCUMENTS

| | | | | |
|---|---|---|---|---|
| 6,560,725 | B1* | 5/2003 | Longwell | G06F 11/073 711/105 |
| 7,797,610 | B1* | 9/2010 | Simkins | G11C 8/16 714/763 |
| 2003/0191888 | A1* | 10/2003 | Klein | G06F 1/3225 711/105 |
| 2007/0011513 | A1 | 1/2007 | Biswas et al. | |
| 2010/0332943 | A1* | 12/2010 | D'Abreu | G06F 11/1068 714/763 |
| 2012/0317352 | A1* | 12/2012 | Kang | G11C 11/40611 711/106 |
| 2014/0211579 | A1* | 7/2014 | Lovelace | G11C 11/40607 365/200 |
| 2017/0139641 | A1* | 5/2017 | Cha | G11C 11/40611 |
| 2018/0046580 | A1* | 2/2018 | Clark | G06F 11/1474 |
| 2018/0150350 | A1* | 5/2018 | Cha | G06F 11/1016 |

FOREIGN PATENT DOCUMENTS

KR 1020170056823 5/2017

* cited by examiner

*Primary Examiner* — Kyle Vallecillo
(74) *Attorney, Agent, or Firm* — IP & T Group LLP

(57) ABSTRACT

A semiconductor system includes a first semiconductor device and a second semiconductor device. The first semiconductor device generates a first error scrub control signal and a second error scrub control signal according to a logic level combination of an error code including information on the error occurrence number of times. The second semiconductor device performs an error scrub operation of a memory area on a first cycle time in response to the first error scrub control signal during a refresh operation and performs the error scrub operation of the memory area on a second cycle time in response to the second error scrub control signal during the refresh operation.

18 Claims, 13 Drawing Sheets

SEMICONDUCTOR DEVICES AND SEMICONDUCTOR SYSTEMS INCLUDING THE SAME

CROSS-REFERENCE TO RELATED APPLICATIONS

This application claims priority under 35 U.S.C 119(a) to Korean Patent Application No. 10-2017-0175331, filed on Dec. 19, 2017, which is incorporated herein by reference in its entirety.

BACKGROUND

1. Technical Field

Embodiments of the disclosure relate to a semiconductor device performing an error scrub operation and electronic systems including the semiconductor device.

2. Related Art

A semiconductor may be designed according to various schemes to input or output multi-bit data during each clock cycle for improving an operation speed of the semiconductor device. However, as the speed for inputting or outputting data to and from the semiconductor device increases, the probability for a data error may also increase. Thus, improved methods and/or devices may be required for enhancing data processing to and from a memory device.

In data processing in semiconductor devices, in order to improve the reliability of data transmission, data are typically transmitted with error codes which are used for detecting and correcting errors in the data. Hence, typical error codes may include an error detection code (EDC) for detecting errors and an error correction code (ECC) for correcting the errors.

SUMMARY

According to an embodiment, a semiconductor system can include a first semiconductor device and a second semiconductor device. The first semiconductor device may generate a first error scrub control signal and a second error scrub control signal according to a logic level combination of an error code including information on the error occurrence number of times. The second semiconductor device may perform an error scrub operation of a memory area on a first cycle time in response to the first error scrub control signal during a refresh operation and may perform the error scrub operation of the memory area on a second cycle time in response to the second error scrub control signal during the refresh operation.

According to another embodiment, a semiconductor device is provided. The semiconductor device may include an error detection circuit, an error scrub control signal generation circuit and a control circuit. The error detection circuit may detect an error included in internal data outputted from a memory area to generate an error code that is counted if the error of the internal data is detected, during a refresh operation. The error scrub control signal generation circuit may generate a first error scrub control signal and a second error scrub control signal according to a logic level combination of the error code. The control circuit may perform an error scrub operation on a first cycle time in response to the first error scrub control signal and may perform the error scrub operation on a second cycle time in response to the second error scrub control signal.

According to yet another embodiment, a semiconductor device is provided. The semiconductor device may include an error detection circuit and a control circuit. The error detection circuit may generate an error code including information on an error included in internal data outputted from a memory area during a refresh operation. The control circuit may adjust a cycle time of an error scrub operation in response to a first error scrub control signal and a second error scrub control signal according to a logic level combination of the error code.

Other applications of the disclosure will become apparent to those skilled in the art when the following description of preferred embodiments contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

The present disclosure can provide a semiconductor device or a semiconductor system including plural semiconductor devices, which control, change or adjust a cycle or a period for an error scrub operation in response to error occurrences in a refresh operation.

In describing the present disclosure, when it is determined that the detailed description of the known related art may obscure the gist of the present disclosure, the detailed description thereof will be omitted.

Although the terms such as first and second may be used to describe various components, the components are not limited by the terms, and the terms are used only to distinguish components from other components.

The terminology used herein is for the purpose of describing particular embodiments only and is not intended to be limiting of the present invention. As used herein, singular forms are intended to include the plural forms as well, unless the context clearly indicates otherwise.

It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Figure 1:
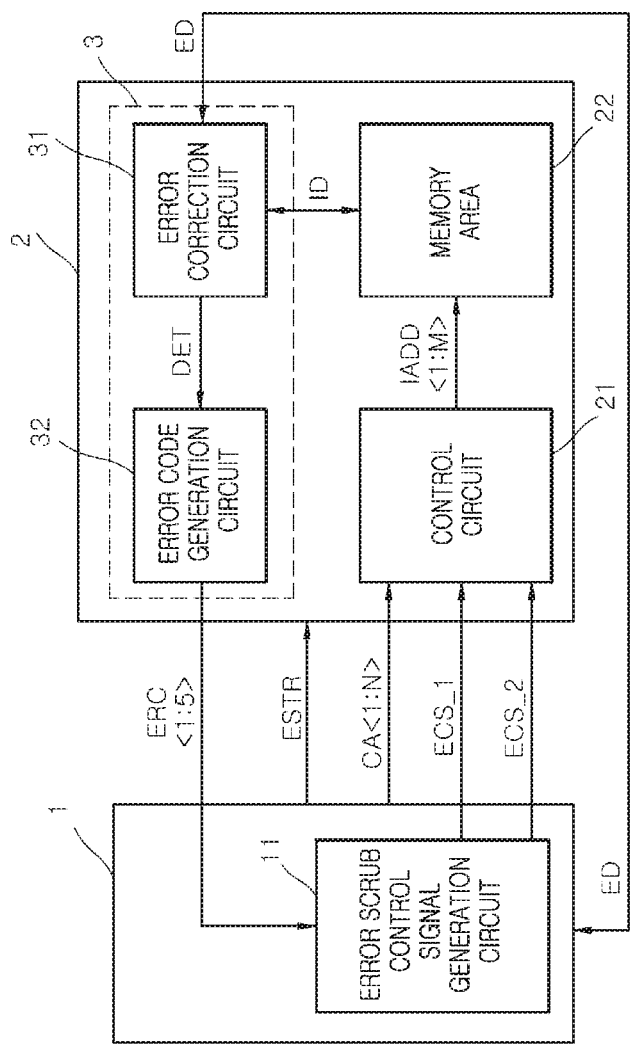
FIG. 1 is a block diagram illustrating a configuration of a semiconductor system according to an embodiment of the disclosure.

Referring now to FIG. 1, a block diagram shows a configuration of a semiconductor system according to an embodiment. The semiconductor system may include plural semiconductor devices, i.e., a first semiconductor device 1 and a second semiconductor device 2.

The first semiconductor device 1 may output an error scrub entry signal ESTR for activating an error scrub operation. The first semiconductor device 1 may receive or output external data ED. The first semiconductor device 1 may output the external data ED to the second semiconductor device 2 during a write operation. The first semiconductor device 1 may receive the external data ED from the second semiconductor device 2 during a read operation. The first semiconductor device 1 may output a command/address signal CA<1:N> used for controlling operations of the second semiconductor device 2. The command/address signal CA<1:N> may include a command for executing a write operation, a read operation or a refresh operation of the second semiconductor device 2. The command/address signal CA<1:N> may include an address for indicating or selecting memory cells in the memory area 22 of the second semiconductor device 2. The number "N" of bits included in the command/address signal CA<1:N> may vary and may a natural number. The command/address signal CA<1:N> may be delivered via one or more signal lines. The signal lines may be designed to transmit at least one of addresses, commands and data. The error scrub operation may include correcting errors of internal data ID stored in the memory area 22 and restoring the corrected internal data into the memory area 22. By the way of example but not limitation, a write operation may include outputting external data ED from the first semiconductor device 1 and storing them into the memory area 22 of the second semiconductor device 2 as internal data ID. The read operation may include outputting internal data ID stored in the memory area 22 as external data ED. Although not illustrated in FIG. 1, the error scrub entry signal ESTR may be generated by a circuit included in the first semiconductor device 1. The error scrub entry signal ESTR may be transmitted from the circuit included in the first semiconductor device 1 into an error scrub control signal output circuit 120 illustrated in FIG. 2. The error scrub entry signal ESTR may be transmitted from the circuit included in the first semiconductor device 1 into a latch signal generation circuit 121 illustrated in FIG. 4.

The first semiconductor device 1 may include an error scrub control signal generation circuit 11.

The error scrub control signal generation circuit 11 may generate a first error scrub control signal ECS_1 enabled when the counted number of an error code ERC<1:5> including five bits is equal to or less than a predetermined number. The error scrub control signal generation circuit 11 may generate a second error scrub control signal ECS_2 enabled when the counted number of the error code ERC<1:5> is greater than the predetermined number. The error scrub control signal generation circuit 11 may generate the first error scrub control signal ECS_1 and the second error scrub control signal ECS_2, one of which is selectively enabled according to a logic level combination of the error code ERC<1:5>. The error code ERC<1:5> may be a signal including information regarding the error occurrences. Although the error code ERC<1:5> has five bits in this example, the number of bits included in the error code may be determined differently according to an embodiments. While one of the first error scrub control signal ECS_1 and the second error scrub control signal ECS_2 is enabled, the other may be disabled.

As described above, the first semiconductor device 1 may output the error scrub entry signal ESTR for activating the error scrub operation. The first semiconductor device 1 may output the command/address signal CA<1:N> for controlling operations of the second semiconductor device 2. The first semiconductor device 1 may receive or output the external data ED. The first semiconductor device 1 may generate the first error scrub control signal ECS_1 enabled when the counted number of the error code ERC<1:5> is equal to or less than the predetermined number during the error scrub operation while the refresh operation is performed. The first semiconductor device 1 may generate the second error scrub control signal ECS_2 enabled when the counted number of the error code ERC<1:5> is greater than the predetermined number during the error scrub operation while the refresh operation is performed.

The second semiconductor device 2 may include a control circuit 21, a memory area 22 and an error detection circuit 3.

The control circuit 21 may generate an internal address IADD<1:M> from the command/address signal CA<1:N> on a first cycle in response to the first error scrub control signal ECS_1 while the refresh operation is performed. The control circuit 21 may generate the internal address IADD<1:M> from the command/address signal CA<1:N> on a second cycle in response to the second error scrub control signal ECS_2 while the refresh operation is performed. The first cycle may be determined to be twice longer than the second cycle. However, in some embodiments, the first cycle may be "2×N" times longer than the second cycle (where, "N" is a natural number).

The memory area 22 may store the internal data ID whose error is corrected according to the internal address IADD<1:M> after the internal data ID stored in the memory area 22 are outputted according to the internal address IADD<1:M>, during the error scrub operation while the refresh operation is performed. The memory area 22 may store the internal data ID according to the internal address IADD<1:M> during the write operation. The memory area 22 may output the internal data ID, stored therein, during the read operation.

The error detection circuit 3 may include an error correction circuit 31 and an error code generation circuit 32.

The error correction circuit 31 may check the internal data ID for errors and may generate a detection signal DET during the error scrub operation. The error correction circuit 31 may correct the errors of the internal data ID to output the corrected internal data to the memory area 22 during the error scrub operation. The error correction circuit 31 may output the internal data ID as the external data ED during the read operation. The error correction circuit 31 may output the external data ED as the internal data ID during the write operation.

The error correction circuit 31 may be implemented using a general error correction circuit that corrects errors of data using an error detection code (EDC) for detecting the errors and an error correction code (ECC) for correcting the errors by itself.

The error code generation circuit 32 may generate the error code ERC<1:5> that is counted in response to the detection signal DET. The error code generation circuit 32 may generate the error code ERC<1:5> that is sequentially counted up when the detection signal DET is generated.

As such, the error detection circuit 3 may detect errors in the internal data ID which are outputted from the memory area 22 and may correct the errors of the internal data ID during the error scrub operation while the refresh operation is performed. When the internal data ID outputted from the memory area 22 include an error, the error detection circuit 3 may correct the error of the internal data ID and generate the error code ERC<1:5> that is counted.

As described above, the second semiconductor device 2 may periodically perform the error scrub operation of the memory area 22 on the first cycle in response to the first error scrub control signal ECS_1 during the refresh operation. The second semiconductor device 2 may also periodically perform the error scrub operation of the memory area 22 on the second cycle in response to the second error scrub control signal ECS_2 during the refresh operation. The second semiconductor device 2 may store the external data ED as the internal data ID during the write operation and may output the internal data ID as external data ED during the read operation.

Figure 2:
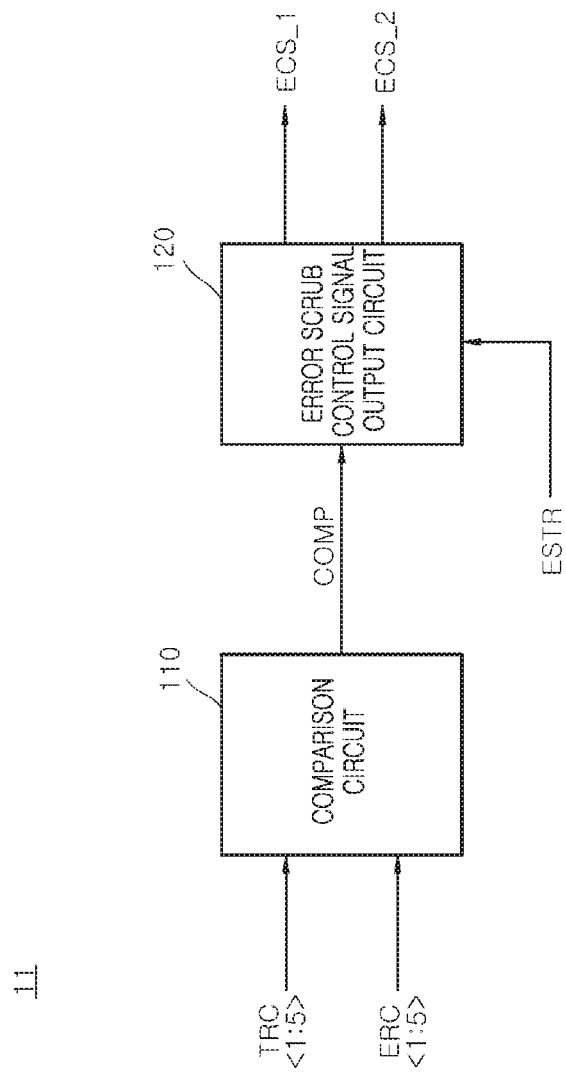
FIG. 2 is a block diagram illustrating a configuration of an example of an error scrub control signal generation circuit included in the semiconductor system of FIG. 1.

Referring to FIG. 2, the error scrub control signal generation circuit 11 may include a comparison circuit 110 and an error scrub control signal output circuit 120.

The comparison circuit 110 may compare the error code ERC<1:5> with a comparison code TRC<1:5> including five bits to generate a comparison signal COMP. The comparison circuit 110 may generate the comparison signal COMP which is disabled when the counted number of the error code ERC<1:5> is equal to or less than a logic level combination of the comparison code TRC<1:5>. The comparison circuit 110 may generate the comparison signal COMP which is enabled when the counted number of the error code ERC<1:5> is greater than a logic level combination of the comparison code TRC<1:5>. A logic level of the enabled comparison signal COMP may be determined as a logic "high" level. A logic level of the enabled comparison signal COMP may be determined to be different according to various embodiments. The comparison code TRC<1:5> may be determined to have a logic level combination corresponding to a predetermined number.

The error scrub control signal output circuit 120 may output the first error scrub control signal ECS_1 enabled when the comparison signal COMP is disabled, in response to the error scrub entry signal ESTR. The error scrub control signal output circuit 120 may output the second error scrub control signal ECS_2 which is enabled when the comparison signal COMP is enabled, in response to the error scrub entry signal ESTR.

Figure 3:
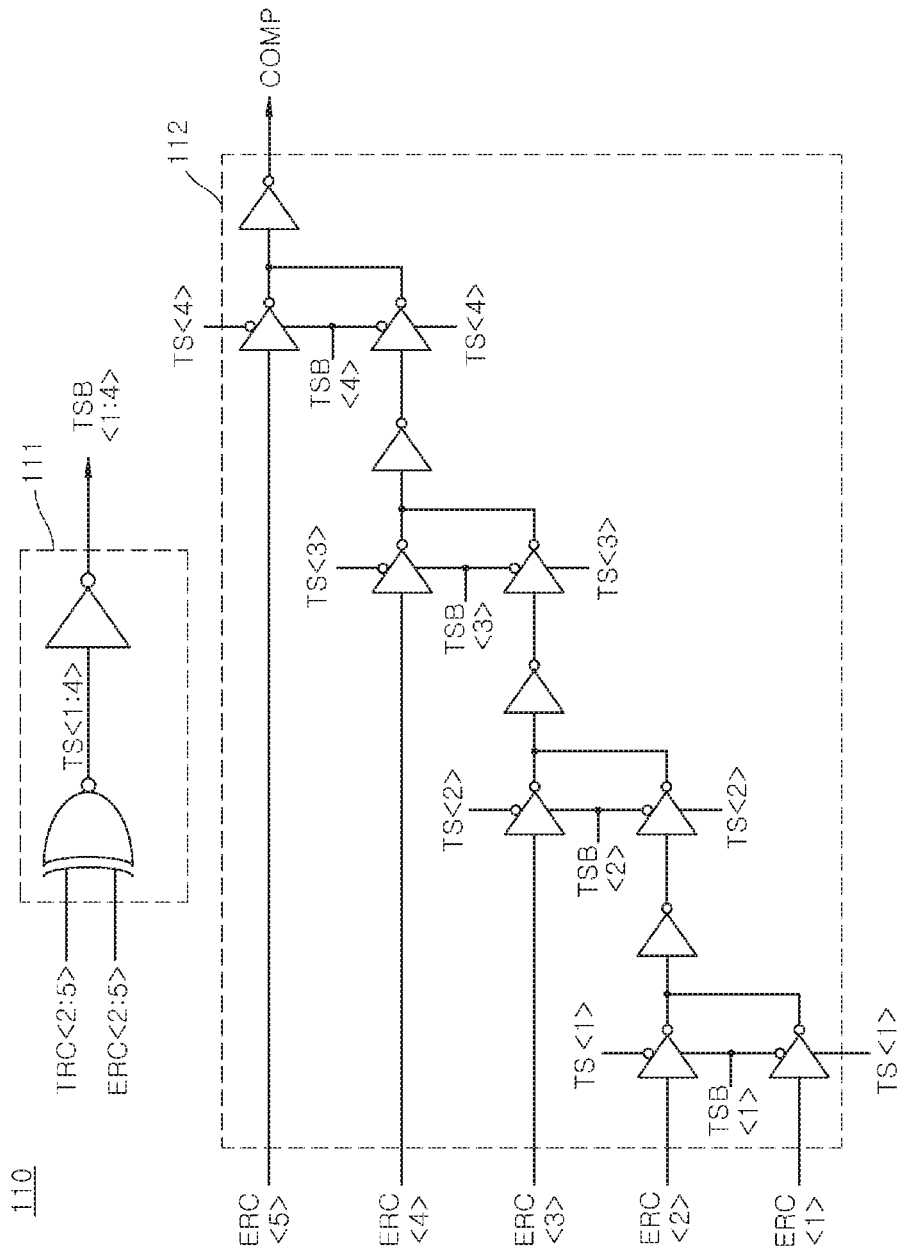
FIG. 3 is a circuit diagram illustrating a configuration of an example of a comparison circuit included in the error scrub control signal generation circuit of FIG. 2.

Referring to FIG. 3, the comparison circuit 110 may include a transmission signal generation circuit 111 and a signal transmission circuit 112.

The transmission signal generation circuit 111 may compare the second to fifth bit data ERC<2:5> of the error code ERC<1:5> with the second to fifth bit data TRC<2:5> of the comparison code TRC<1:5> to generate first to fourth transmission signals TS<1:4> and first to fourth inverted transmission signals TSB<1:4>. The transmission signal generation circuit 111 may generate the first to fourth transmission signals TS<1:4> by performing a logical exclusive NOR operation on the second to fifth bit data ERC<2:5> of the error code ERC<1:5> and the second to fifth bit data TRC<2:5> of the comparison code TRC<1:5>. The transmission signal generation circuit 111 may generate the first to fourth inverted transmission signals TSB<1:4> by performing a logical exclusive OR operation on the second to fifth bit data ERC<2:5> of the error code ERC<1:5> and the second to fifth bit data TRC<2:5> of the comparison code TRC<1:5>. The first to fourth inverted transmission signals TSB<1:4> may be generated by inverting the first to fourth transmission signals TS<1:4>. Although FIG. 3 illustrates the transmission signal generation circuit 111 with a single circuit, the transmission signal generation circuit 111 may be actually implemented in a formation of a plurality of circuits, each of which receives any one of bits included in the error code ERC<2:5> and any one of bits included in the comparison code TRC<2:5>. That is, the transmission signal generation circuit 111 may be implemented in a formation of four circuits, each of which may include a single exclusive NOR gate and a single inverter to generate one of the first to fourth inverted transmission signals TSB<1:4>.

The signal transmission circuit 112 may receive the error code ERC<1:5> to generate the comparison signal COMP in response to the first to fourth transmission signals TS<1:4> and the first to fourth inverted transmission signals TSB<1:4>.

The signal transmission circuit 112 may interrupt the input of the first to fourth bit data ERC<1:4> of the error code ERC<1:5> and buffer the fifth bit datum ERC<5> of the error code ERC<1:5> to output the buffered fifth bit datum ERC<5> of the error code ERC<1:5> as the comparison signal COMP, when the fourth transmission signal TS<4> has a logic "low" level. The signal transmission circuit 112 may generate the comparison signal COMP from the first to fourth bit data ERC<1:4> of the error code ERC<1:5> according to a logic level combination of the first to third transmission signals TS<1:3> when the fourth transmission signal TS<4> has a logic "high" level.

The signal transmission circuit 112 may interrupt the input of the first to third bit data ERC<1:3> of the error code ERC<1:5> and buffer the fourth bit datum ERC<4> of the error code ERC<1:5> to output the buffered fourth bit datum ERC<4> of the error code ERC<1:5> as the comparison signal COMP, when the third transmission signal TS<3> has a logic "low" level. The signal transmission circuit 112 may generate the comparison signal COMP from the first to third bit data ERC<1:3> of the error code ERC<1:5> according to a logic level combination of the first and second transmission signals TS<1:2> when the third transmission signal TS<3> has a logic "high" level.

The signal transmission circuit 112 may interrupt the input of the first and second bit data ERC<1:2> of the error code ERC<1:5> and buffer the third bit datum ERC<3> of the error code ERC<1:5> to output the buffered third bit datum ERC<3> of the error code ERC<1:5> as the comparison signal COMP, when the second transmission signal TS<2> has a logic "low" level. The signal transmission circuit 112 may generate the comparison signal COMP from the first and second bit data ERC<1:2> of the error code ERC<1:5> according to a logic level of the first transmission signal TS<1> when the second transmission signal TS<2> has a logic "high" level.

The signal transmission circuit 112 may interrupt the input of the first bit datum ERC<1> of the error code ERC<1:5> and buffer the second bit datum ERC<2> of the error code ERC<1:5> to output the buffered second bit datum ERC<2> of the error code ERC<1:5> as the comparison signal COMP, when the first transmission signal TS<1> has a logic "low" level. The signal transmission circuit 112 may generate the comparison signal COMP from the first bit datum ERC<1> of the error code ERC<1:5> when the first transmission signal TS<1> has a logic "high" level.

More specifically, an operation of the comparison circuit 110 will be described hereinafter in conjunction with an example in which the comparison code TRC<1:5> is determined to have a binary code of '01000' corresponding to a natural number of eight. In the comparison code TRC<1:5>, the binary code of '01000' may indicate that only the fourth bit datum TRC<4> of the comparison code TRC<1:5> has a logic "high" level.

First, a case where the counted number of the error code ERC<1:5> is less than a logic level combination of the comparison code TRC<1:5> will be described hereinafter.

When the error code ERC<1:5> is increased from a binary code of '00000' up to a binary code of '00111,' which is less than a logic level combination of the comparison code TRC<1:5>, the transmission signal generation circuit 111 may generate the third transmission signal TS<3> having a logic "low" level and the fourth transmission signal TS<4> having a logic "high" level.

The signal transmission circuit 112 may buffer the fourth bit datum ERC<4> of the error code ERC<1:5> to generate the comparison signal COMP having a logic "low" level since the third transmission signal TS<3> has a logic "low" level and the fourth transmission signal TS<4> has a logic "high" level.

When the error code ERC<1:5> becomes a binary code of '01000' equal to a logic level combination of the comparison code TRC<1:5>, the transmission signal generation circuit 111 may generate the first to fourth transmission signals TS<1:4> having a logic "high" level.

The signal transmission circuit 112 may buffer the first bit datum ERC<1> of the error code ERC<1:5> to generate the comparison signal COMP having a logic "low" level since the first to fourth transmission signals TS<1:4> have a logic "high" level.

When the error code ERC<1:5> is changed from a binary code of '01001' up to a binary code of '01011' which is greater than a logic level combination of the comparison code TRC<1:5>, the transmission signal generation circuit 111 may generate the second to fourth transmission signals TS<2:4> having a logic "high" level.

The signal transmission circuit 112 may buffer the first bit datum ERC<1> of the error code ERC<1:5> to generate the comparison signal COMP having a logic "high" level when the second to fourth transmission signals TS<2:4> have a logic "high" level and the first transmission signal TS<1> has a logic "high" level. The signal transmission circuit 112 may buffer the second bit datum ERC<2> of the error code ERC<1:5> to generate the comparison signal COMP having a logic "high" level when the second to fourth transmission signals TS<2:4> have a logic "high" level but the first transmission signal TS<1> has a logic "low" level.

When the error code ERC<1:5> is counted from a binary code of '01100' up to a binary code of '01111' which is greater than a logic level combination of the comparison code TRC<1:5>, the transmission signal generation circuit 111 may generate the third and fourth transmission signals TS<3:4> having a logic "high" level.

The signal transmission circuit 112 may buffer the third bit datum ERC<3> of the error code ERC<1:5> to generate the comparison signal COMP having a logic "high" level when the third and fourth transmission signals TS<3:4> have a logic "high" level but the second transmission signal TS<2> has a logic "low" level. The signal transmission circuit 112 may buffer the first bit datum ERC<1> of the error code ERC<1:5> to generate the comparison signal COMP having a logic "high" level when the second to fourth transmission signals TS<2:4> have a logic "high" level and the first transmission signal TS<1> has a logic "high" level. The signal transmission circuit 112 may buffer the second bit datum ERC<2> of the error code ERC<1:5> to generate the comparison signal COMP having a logic "high" level when the second to fourth transmission signals TS<2:4> have a logic "high" level but the first transmission signal TS<1> has a logic "low" level.

When the error code ERC<1:5> is counted from a binary code of '10000' up to a binary code of '11111' which is greater than a logic level combination of the comparison code TRC<1:5>, the transmission signal generation circuit 111 may generate the fourth transmission signal TS<4> having a logic "high" level.

The signal transmission circuit 112 may buffer the fifth bit datum ERC<5> of the error code ERC<1:5> to generate the comparison signal COMP having a logic "high" level when the fourth transmission signal TS<4> have a logic "high" level.

As described above, the comparison circuit 110 may generate the comparison signal COMP having a logic "low" level when the counted number of the error code ERC<1:5> is equal to or less than the predetermined number. In addition, the comparison circuit 110 may generate the comparison signal COMP having a logic "high" level when the counted number of the error code ERC<1:5> is greater than the predetermined number.

Figure 4:
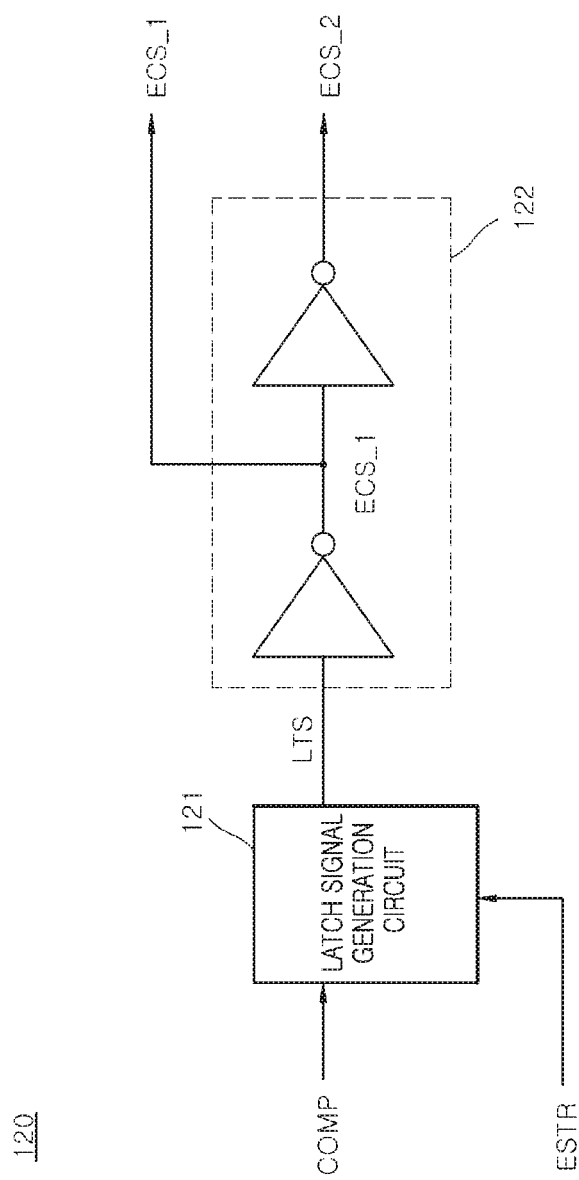
FIG. 4 is a circuit diagram illustrating a configuration of an example of an error scrub control signal output circuit included in the error scrub control signal generation circuit of FIG. 2.

Referring to FIG. 4, the error scrub control signal output circuit 120 may include the latch signal generation circuit 121 and a buffer circuit 122.

The latch signal generation circuit 121 may output the comparison signal COMP as a latch signal LTS in response to the error scrub entry signal ESTR. The latch signal generation circuit 121 may latch the comparison signal COMP and may output the latched comparison signal as the latch signal LTS, in response to the error scrub entry signal ESTR.

The buffer circuit 122 may buffer the latch signal LTS to generate the first error scrub control signal ECS_1 and the second error scrub control signal ECS_2. The buffer circuit 122 may inversely buffer the latch signal LTS to generate the first error scrub control signal ECS_1 through a first invertor. The buffer circuit 122 may inversely buffer the first error scrub control signal ECS_1 through a second invertor to generate the second error scrub control signal ECS_2.

Figure 5:
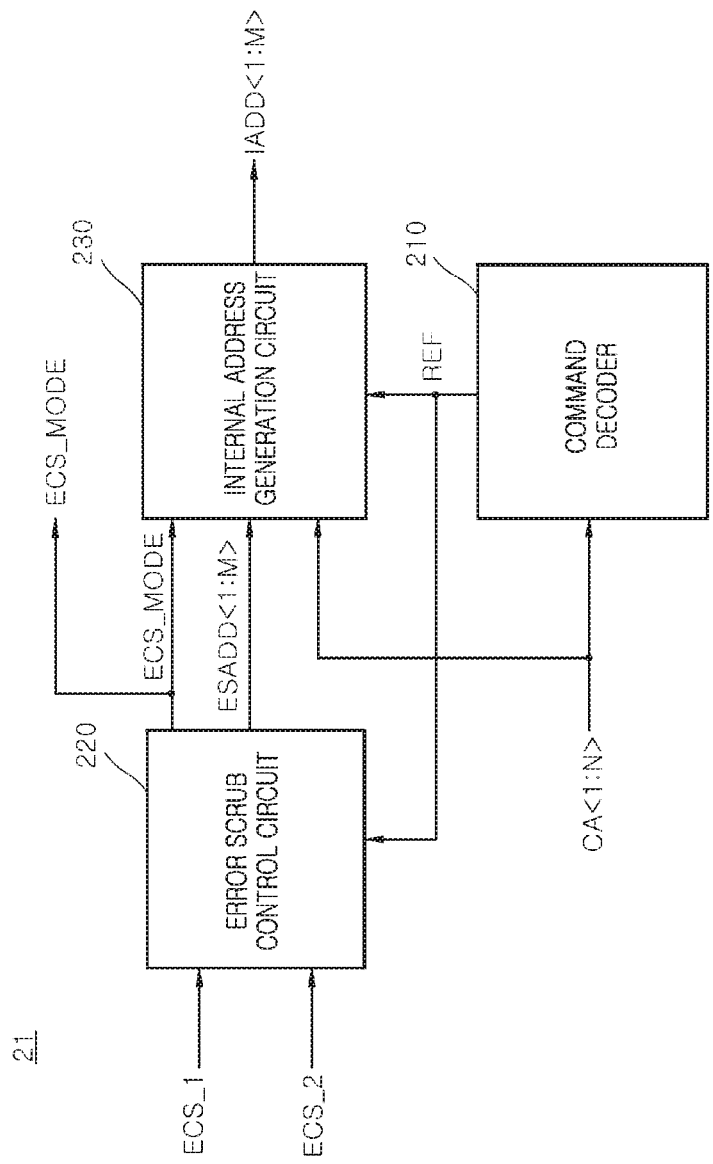
FIG. 5 is a block diagram illustrating a configuration of an example of a control circuit included in the semiconductor system of FIG. 1.

Referring to FIG. 5, the control circuit 21 may include a command decoder 210, an error scrub control circuit 220 and an internal address generation circuit 230.

The command decoder 210 may decode the command/address signal CA<1:N> to generate a refresh signal REF. The command decoder 210 may decode some bit data for a command among bit data of the command/address signal CA<1:N> to generate the refresh signal REF. The refresh signal REF may be a periodically toggled signal. Although the command decoder 210 illustrated in FIG. 5 is configured to decode the command/address signal CA<1:N> and generate the refresh signal REF, the command decoder 210 may be configured to generate a signal for performing the write operation or the read operation.

The error scrub control circuit 220 may generate a mode signal ECS_MODE including pulses made on the first cycle or the second cycle according to how many times the refresh signal REF is entered, in response to the first error scrub control signal ECS_1 and the second error scrub control signal ECS_2. The error scrub control circuit 220 may generate the mode signal ECS_MODE including pulses which are made on the first cycle according to the number of times the refresh signal is entered when the first error scrub control signal ECS_1 is enabled. The error scrub control circuit 220 may generate the mode signal ECS_MODE including pulses which are made on the second cycle according to the number of times the refresh signal is entered when the second error scrub control signal ECS_2 is enabled. The error scrub control circuit 220 may output a scrub address ESADD<1:M> on the first cycle or the second cycle according to the number of times the refresh signal is entered in response to the first error scrub control signal ECS_1 and the second error scrub control signal ECS_2. The error scrub control circuit 220 may output the scrub address ESADD<1:M> on the first cycle according to the number of times the refresh signal is entered when the first error scrub control signal ECS_1 is enabled. The error scrub control circuit 220 may output the scrub address ESADD<1:M> on the second cycle according to the number of times the refresh signal is entered when the second error scrub control signal ECS_2 is enabled. The scrub address ESADD<1:M> may include location information on an area (i.e., a portion of the memory area 22) in which the error scrub operation is performed.

The internal address generation circuit 230 may output any one of the command/address signal CA<1:N> and the scrub address ESADD<1:M> in response to the mode signal ECS_MODE and the refresh signal REF. The internal address generation circuit 230 may output a portion of bit data of the command/address signal CA<1:N> as the internal address IADD<1:M> when the mode signal ECS_MODE is disabled and the refresh signal REF is inactivated. The internal address generation circuit 230 may output the scrub address ESADD<1:M> as the internal address IADD<1:M> when the mode signal ECS_MODE is enabled and the refresh signal REF is activated. The internal address generation circuit 230 may count the internal address IADD<1:M> in response to the mode signal ECS_MODE and the refresh signal REF. The internal address generation circuit 230 may sequentially count the internal address IADD<1:M> when the mode signal ECS_MODE is disabled but the refresh signal REF is activated.

Figure 6:
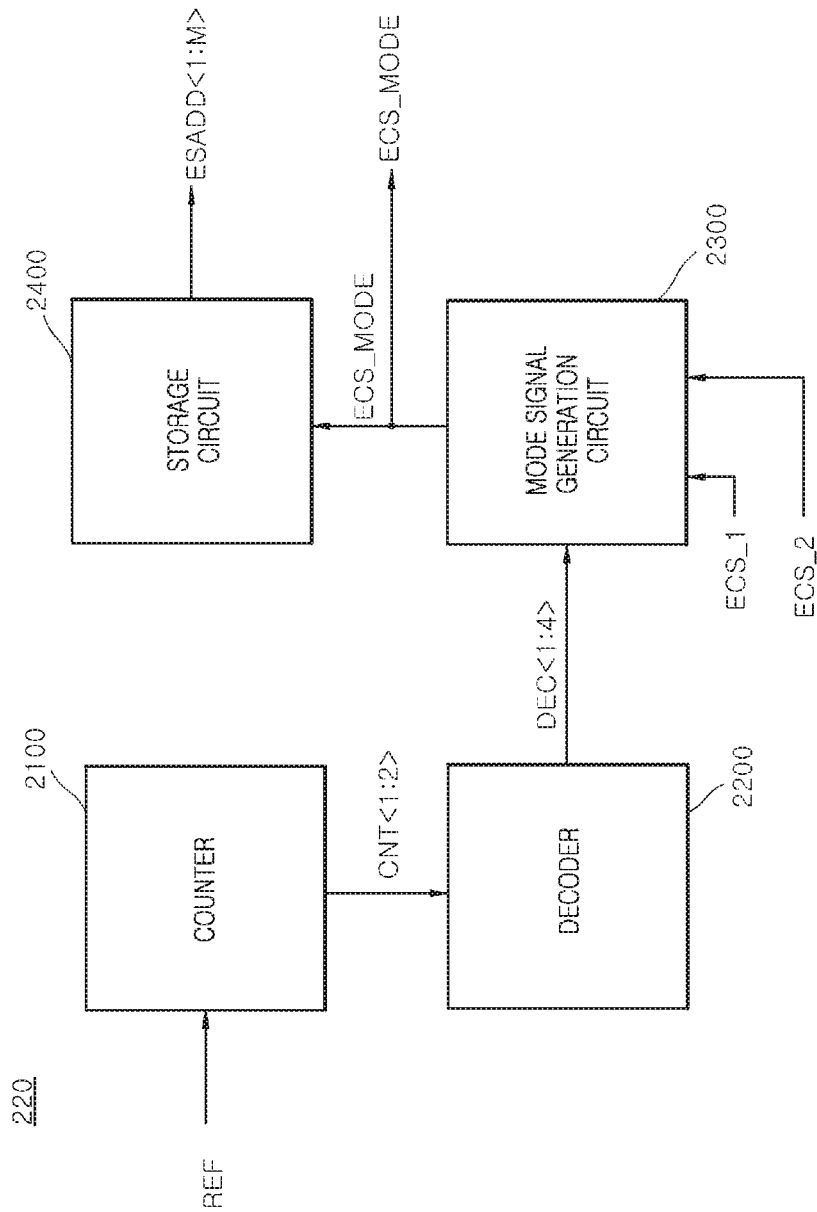
FIG. 6 is a block diagram illustrating a configuration of an example of an error scrub control circuit included in the control circuit of FIG. 5.

Referring to FIG. 6, the error scrub control circuit 220 may include a counter 2100, a decoder 2200, a mode signal generation circuit 2300 and a storage circuit 2400.

The counter 2100 may generate a count signal CNT<1:2> including a first count signal CNT<1> and a second count signal CNT<2> which are sequentially counted in response to the refresh signal REF. The counter 2100 may generate the count signal CNT<1:2> which is sequentially counted up when a pulse of the refresh signal REF is inputted to the counter 2100.

The decoder 2200 may decode the count signal CNT<1:2> to generate first to fourth decoded signals DEC<1:4>, one of which is selectively enabled.

More specifically, the decoder 2200 may generate the first decoded signal DEC<1> enabled to have a logic "high" level when the first count signal CNT<1> has a logic "low" level and the second count signal CNT<2> has a logic "low" level. The decoder 2200 may generate the second decoded signal DEC<2> enabled to have a logic "high" level when the first count signal CNT<1> has a logic "high" level but the second count signal CNT<2> has a logic "low" level. The decoder 2200 may generate the third decoded signal DEC<3> enabled to have a logic "high" level when the first count signal CNT<1> has a logic "low" level but the second count signal CNT<2> has a logic "high" level. The decoder 2200 may generate the fourth decoded signal DEC<4> enabled to have a logic "high" level when the first count signal CNT<1> has a logic "high" level and the second count signal CNT<2> has a logic "high" level.

The mode signal generation circuit 2300 may generate the mode signal ECS_MODE from the first to fourth decoded signals DEC<1:4> in response to the first error scrub control signal ECS_1 and the second error scrub control signal ECS_2. The mode signal generation circuit 2300 may generate the mode signal ECS_MODE from the fourth decoded signal DEC<4> when the first error scrub control signal ECS_1 is enabled. The mode signal generation circuit 2300 may generate the mode signal ECS_MODE enabled when the first error scrub control signal ECS_1 is enabled and the fourth decoded signal DEC<4> has a logic "high" level. The mode signal generation circuit 2300 may generate the mode signal ECS_MODE from the second decoded signal DEC<2> and the fourth decoded signal DEC<4> when the second error scrub control signal ECS_2 is enabled. The mode signal generation circuit 2300 may generate the mode signal ECS_MODE which is enabled when the second error scrub control signal ECS_2 is enabled and when any one of the second decoded signal DEC<2> and the fourth decoded signal DEC<4> has a logic "high" level.

The storage circuit 2400 may output the scrub address ESADD<1:M> in response to the mode signal ECS_MODE. The storage circuit 2400 may output the scrub address ESADD<1:M> when the mode signal ECS_MODE is enabled as a logic "high" level.

Figure 7:
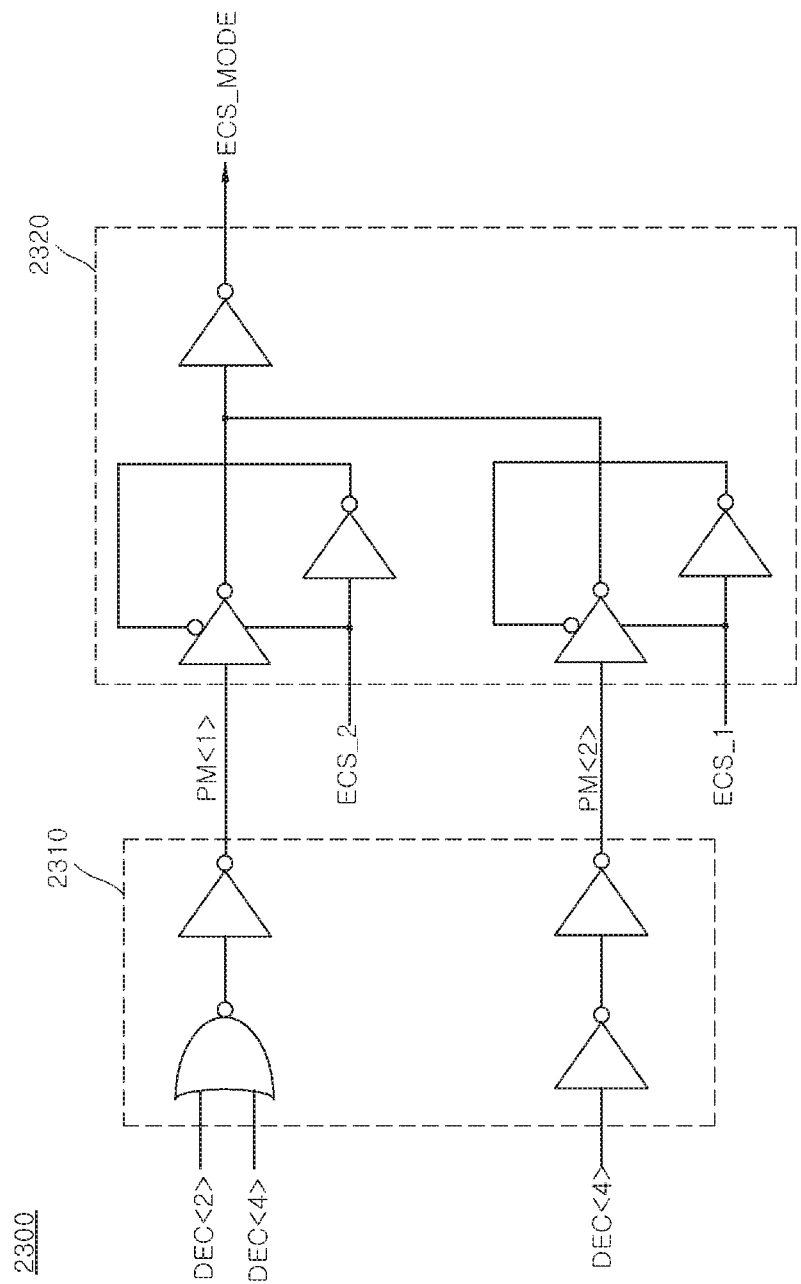
FIG. 7 is a circuit diagram illustrating a configuration of an example of a mode signal generation circuit included in the error scrub control circuit of FIG. 6.

Referring to FIG. 7, the mode signal generation circuit 2300 may include a pre-mode signal generation circuit 2310 and a selection/transmission circuit 2320.

The pre-mode signal generation circuit 2310 may generate a first pre-mode signal PM<1> in response to the second decoded signal DEC<2> and the fourth decoded signal DEC<4>. The pre-mode signal generation circuit 2310 may perform a logical OR operation on the second decoded signal DEC<2> and the fourth decoded signal DEC<4> to generate the first pre-mode signal PM<1>. The pre-mode signal generation circuit 2310 may generate the first pre-mode signal PM<1> enabled to have a logic "high" level when at least one of the second decoded signal DEC<2> and the fourth decoded signal DEC<4> is generated to have a logic "high" level. The pre-mode signal generation circuit 2310 may generate a second pre-mode signal PM<2> in response to the fourth decoded signal DEC<4>. The pre-mode signal generation circuit 2310 may generate the second pre-mode signal PM<2> enabled to have a logic "high" level when the fourth decoded signal DEC<4> has a logic "high" level.

The selection/transmission circuit 2320 may output any one of the first pre-mode signal PM<1> and the second pre-mode signal PM<2> as the mode signal ECS_MODE in response to the first error scrub control signal ECS_1 and the second error scrub control signal ECS_2. The selection/transmission circuit 2320 may output the first pre-mode signal PM<1> as the mode signal ECS_MODE when the second error scrub control signal ECS_2 has a logic "high" level. The selection/transmission circuit 2320 may buffer the first pre-mode signal PM<1> to output the buffered first pre-mode signal as the mode signal ECS_MODE when the second error scrub control signal ECS_2 is enabled to have a logic "high" level. The selection/transmission circuit 2320 may output the second pre-mode signal PM<2> as the mode signal ECS_MODE when the first error scrub control signal ECS_1 is enabled to have a logic "high" level. The selection/transmission circuit 2320 may buffer the second pre-mode signal PM<2> to output the buffered second pre-mode signal as the mode signal ECS_MODE when the first error scrub control signal ECS_1 is enabled to have a logic "high" level.

Figure 8:
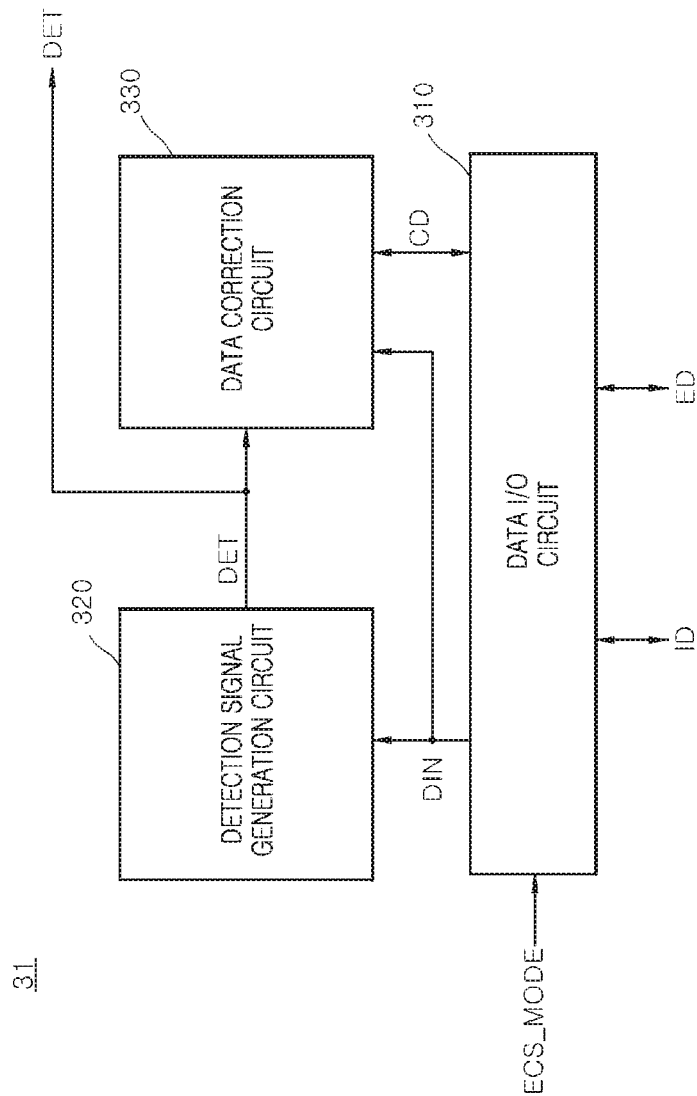
FIG. 8 is a block diagram illustrating a configuration of an example of an error correction circuit included in the semiconductor system of FIG. 1.

Referring to FIG. 8, the error correction circuit 31 may include a data input/output (I/O) circuit 310, a detection signal generation circuit 320 and a data correction circuit 330.

The data I/O circuit 310 may output the internal data ID outputted from the memory area 22 as input data DIN in response to the mode signal ECS_MODE. The data I/O circuit 310 may output the internal data ID outputted from the memory area 22 as the input data DIN when the mode signal ECS_MODE is enabled. The data I/O circuit 310 may correct errors of the input data DIN as the internal data ID, in response to the mode signal ECS_MODE, to generate and output corrected data CD. The data I/O circuit 310 may output the corrected data CD generated by correcting errors of the input data DIN as the internal data ID when the mode signal ECS_MODE is enabled. The data I/O circuit 310 may output the internal data ID as the external data ED during the read operation in response to the mode signal ECS_MODE. The data I/O circuit 310 may output the internal data ID as the external data ED during the read operation when the mode signal ECS_MODE is disabled. The data I/O circuit 310 may output the external data ED as the internal data ID during the write operation in response to the mode signal ECS_MODE. The data I/O circuit 310 may output the external data ED as the internal data ID during the write operation when the mode signal ECS_MODE is disabled.

The detection signal generation circuit 320 may check the input data DIN for errors and generate the detection signal DET. The detection signal generation circuit 320 may enable the detection signal DET when an error in the input data DIN is detected.

The data correction circuit 330 may correct an error in the input data DIN and may output the corrected input data as corrected data CD, in response to the detection signal DET. For example, the data correction circuit 330 may correct an error in the input data DIN and may output the corrected input data as the corrected data CD, when the detection signal DET is enabled. The data correction circuit 330 may output the input data DIN as the corrected data CD when the detection signal DET is disabled.

Figure 9:
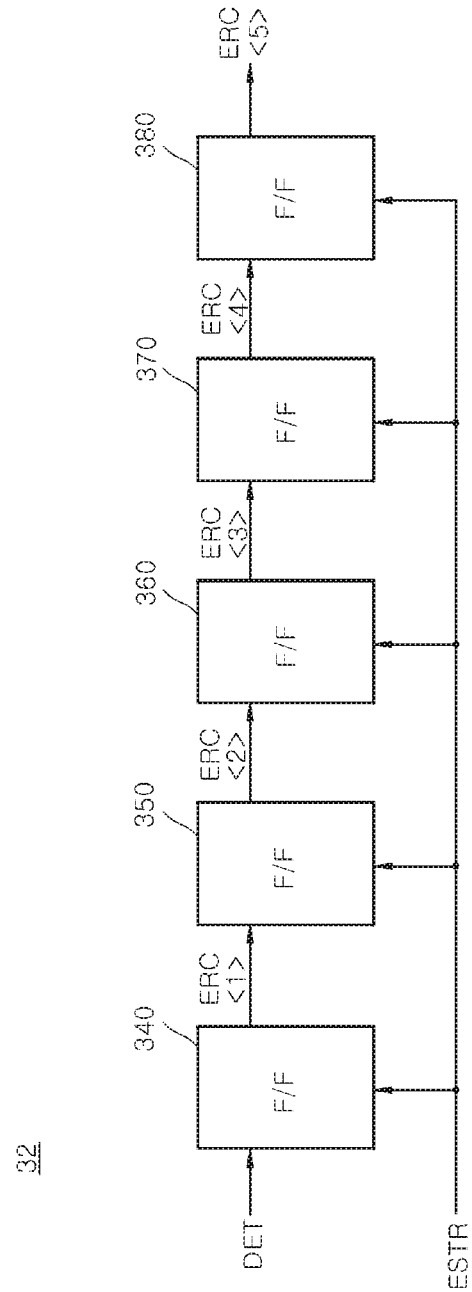
FIG. 9 is a block diagram illustrating a configuration of an example of an error code generation circuit included in the semiconductor system of FIG. 1.

Referring to FIG. 9, the error code generation circuit 32 may include a plurality of flip-flops, e.g., a first flip-flop 340, a second flip-flop 350, a third flip-flop 360, a fourth flip-flop 370 and a fifth flip-flop 380.

The first flip-flop 340 may generate the first bit datum ERC<1> of the error code ERC<1:5>, a level transition of which occurs when the error scrub entry signal ESTR is enabled and a level of the detection signal DET is changed from a logic "high" level into a logic "low" level.

The second flip-flop 350 may generate the second bit datum ERC<2> of the error code ERC<1:5>, a level transition of which occurs when the error scrub entry signal ESTR is enabled and a level of the first bit datum ERC<1> of the error code ERC<1:5> is changed from a logic "high" level into a logic "low" level.

The third flip-flop 360 may generate the third bit datum ERC<3> of the error code ERC<1:5>, a level transition of which occurs when the error scrub entry signal ESTR is enabled and a level of the second bit datum ERC<2> of the error code ERC<1:5> is changed from a logic "high" level into a logic "low" level.

The fourth flip-flop 370 may generate the fourth bit datum ERC<4> of the error code ERC<1:5>, a level transition of which occurs when the error scrub entry signal ESTR is enabled and a level of the third bit datum ERC<3> of the error code ERC<1:5> is changed from a logic "high" level into a logic "low" level.

The fifth flip-flop 380 may generate the fifth bit datum ERC<5> of the error code ERC<1:5>, a level transition of which occurs when the error scrub entry signal ESTR is enabled and a level of the fourth bit datum ERC<4> of the error code ERC<1:5> is changed from a logic "high" level into a logic "low" level.

As described above, the error code generation circuit 32 may generate the error code ERC<1:5> that is sequentially counted when the detection signal DET is generated.

Figure 10:
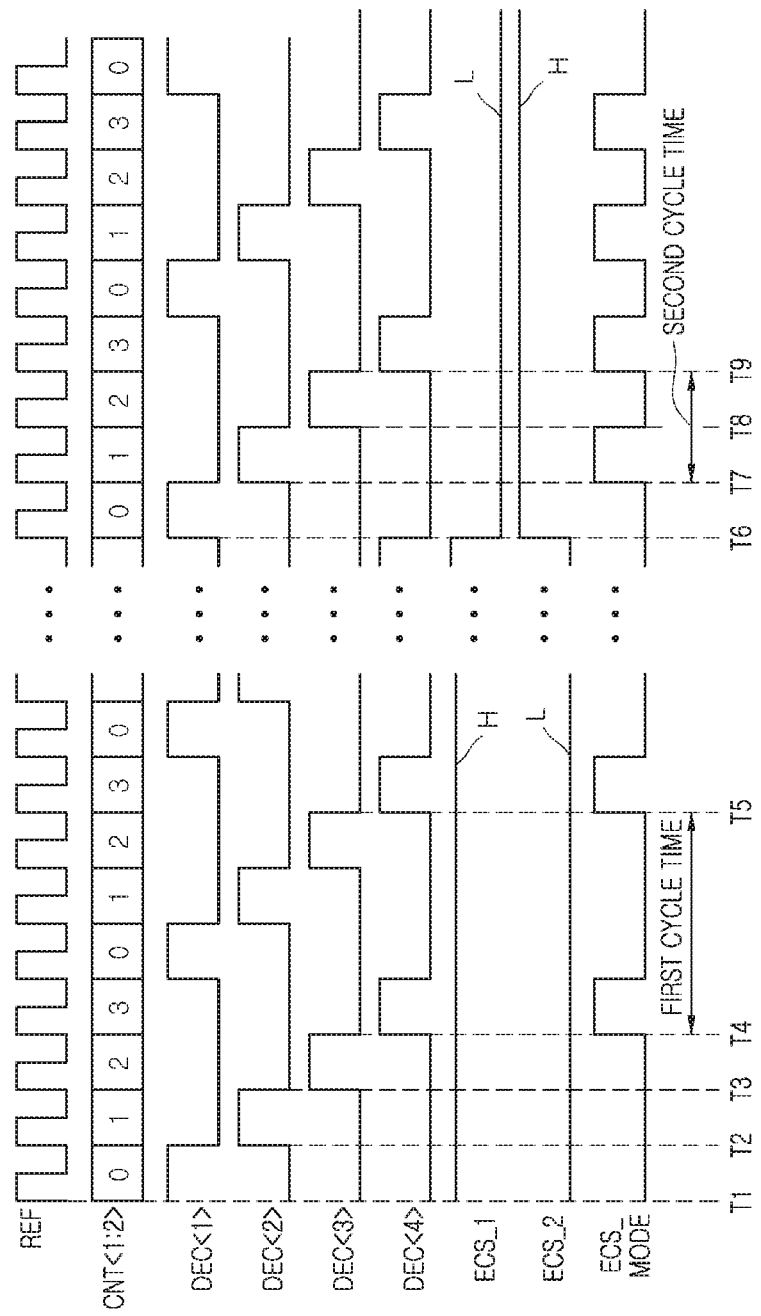
FIG. 10 is a timing diagram illustrating an error scrub operation of a semiconductor system according to an embodiment of the present disclosure.

The error scrub operations of the semiconductor system according to an embodiment will be described hereinafter with reference to FIG. 10. The error scrub operation may include an exemplary case in which the error scrub operation is performed on the first cycle during the refresh operation and another exemplary case in which the error scrub operation is performed on the second cycle during the refresh operation.

First, the error scrub operation performed on the first cycle during the refresh operation will be described hereinafter.

At a first timing "T1", the first semiconductor device 1 may output the error scrub entry signal ESTR for activating the error scrub operation. The first semiconductor device 1 may output the command/address signal CA<1:N> for performing the refresh operation, or the like.

The error scrub control signal generation circuit 11 may generate the first error scrub control signal ECS_1 enabled when the counted number of the error code ERC<1:5> is equal to or less than the predetermined number.

The command decoder 210 of the control circuit 21 may decode the command/address signal CA<1:N> to generate the refresh signal REF.

The counter 2100 may generate the count signal CNT<1:2> that is sequentially counted in response to the refresh signal REF. In such a case, the count signal CNT<1:2> including the first count signal CNT<1> and the second count signal CNT<2> may be determined as an initial value of '0' before the count signal CNT<1:2> is sequentially counted in response to the refresh signal REF.

The decoder 2200 may decode the count signal CNT<1:2> to generate the first decoded signal DEC<1> having a logic "high" level.

At a second timing "T2", the command decoder 210 of the control circuit 21 may decode the command/address signal CA<1:N> to generate the refresh signal REF.

The counter 2100 may generate the count signal CNT<1:2> that is sequentially counted in response to the refresh signal REF. In such a case, the count signal CNT<1:2> may be determined to have a value of '1'. In the count signal CNT<1:2>, the value of '1' may show that the count signal CNT<1:2> is counted up once.

The decoder 2200 may decode the count signal CNT<1:2> to generate the second decoded signal DEC<2> having a logic "high" level.

At a third timing "T3", the command decoder 210 of the control circuit 21 may decode the command/address signal CA<1:N> to generate the refresh signal REF.

The counter 2100 may generate the count signal CNT<1:2> that is sequentially counted in response to the refresh signal REF. In such a case, the count signal CNT<1:2> may be determined to have a value of '2'. In the count signal CNT<1:2>, the value of '2' may describe that the count signal CNT<1:2> is counted up twice.

The decoder 2200 may decode the count signal CNT<1:2> to generate the third decoded signal DEC<3> having a logic "high" level.

At a fourth timing "T4", the command decoder 210 of the control circuit 21 may decode the command/address signal CA<1:N> to generate the refresh signal REF.

The counter 2100 may generate the count signal CNT<1:2> that is sequentially counted in response to the refresh signal REF. In such a case, the count signal CNT<1:2> may be determined to have a value of '3'. In the count signal CNT<1:2>, the value of '3' may indicate that the count signal CNT<1:2> is counted up three times.

The decoder 2200 may decode the count signal CNT<1:2> to generate the fourth decoded signal DEC<4> having a logic "high" level.

The mode signal generation circuit 2300 may generate the mode signal ECS_MODE from the fourth decoded signal DEC<4> in response to the first error scrub control signal ECS_1 enabled to have a logic "high(H)" level.

The storage circuit 2400 may output the scrub address ESADD<1:M> in response to the mode signal ECS_MODE.

The internal address generation circuit 230 may output the scrub address ESADD<1:M> as the internal address IADD<1:M> in response to the mode signal ECS_MODE and the refresh signal REF.

The memory area 22 may output the internal data ID stored therein, according to the internal address IADD<1:M> during the error scrub operation while the refresh operation is performed.

The data I/O circuit 310 may output the internal data ID outputted from the memory area 22 as the input data DIN in response to the mode signal ECS_MODE.

The detection signal generation circuit 320 may detect an error in the input data DIN to generate the detection signal DET.

The data correction circuit 330 may correct an error in the input data DIN to output the corrected input data as the corrected data CD, in response to the detection signal DET.

The data I/O circuit 310 may output the corrected data CD obtained by correcting the error of the input data DIN as the internal data ID in response to the mode signal ECS_MODE.

The memory area 22 may store the internal data ID corresponding to the corrected data CD according to the internal address IADD<1:M>.

Subsequently, the operations performed during a period between the first timing "T1" and the fourth timing "T4" may be executed again or repeatedly. Thus, descriptions of the operations repeatedly executed after the fourth timing "T4" will be omitted hereinafter.

At a fifth timing "T5", the command decoder 210 of the control circuit 21 may decode the command/address signal CA<1:N> to generate the refresh signal REF.

The counter 2100 may generate the count signal CNT<1:2> that is sequentially counted in response to the refresh signal REF. In such a case, the count signal CNT<1:2> may be determined to have a value of '3'. In the count signal CNT<1:2>, the value of '3' may show that the count signal CNT<1:2> is counted up three times.

The decoder 2200 may decode the count signal CNT<1:2> to generate the fourth decoded signal DEC<4> having a logic "high" level.

The mode signal generation circuit 2300 may generate the mode signal ECS_MODE from the fourth decoded signal DEC<4> in response to the first error scrub control signal ECS_1 enabled to have a logic "high(H)" level.

The storage circuit 2400 may output the scrub address ESADD<1:M> in response to the mode signal ECS_MODE.

The internal address generation circuit 230 may output the scrub address ESADD<1:M> as the internal address IADD<1:M> in response to the mode signal ECS_MODE and the refresh signal REF.

The memory area 22 may output the internal data ID stored therein, according to the internal address IADD<1:M> during the error scrub operation while the refresh operation is performed.

The data I/O circuit 310 may output the internal data ID outputted from the memory area 22 as the input data DIN in response to the mode signal ECS_MODE.

The detection signal generation circuit 320 may detect an error in the input data DIN to generate the detection signal DET.

The data correction circuit 330 may correct an error in the input data DIN and may output the corrected input data as the corrected data CD, in response to the detection signal DET.

The data I/O circuit 310 may output the corrected data CD obtained by correcting the error of the input data DIN as the internal data ID in response to the mode signal ECS_MODE.

The memory area 22 may store the internal data ID corresponding to the corrected data CD according to the internal address IADD<1:M>.

As described above, a period between the fourth timing "T4" and the fifth timing "T5" may be a cycle time that the fourth decoded signal DEC<4> is regenerated, which is considered the first cycle. Thus, the error scrub operation may be executed once while the refresh operation is performed four times.

Next, the error scrub operation performed on the second cycle during the refresh operation will be described hereinafter.

At a sixth timing "T6", the first semiconductor device 1 may output the error scrub entry signal ESTR for activating the error scrub operation. The first semiconductor device 1 may output the command/address signal CA<1:N> for performing the refresh operation or the like.

The error scrub control signal generation circuit 11 may generate the second error scrub control signal ECS_2 enabled when the counted number of the error code ERC<1:5> is greater than the predetermined number.

The command decoder 210 of the control circuit 21 may decode the command/address signal CA<1:N> to generate the refresh signal REF.

The counter 2100 may generate the count signal CNT<1:2> that is sequentially counted in response to the refresh signal REF. In such a case, the count signal CNT<1:2> including the first count signal CNT<1> and the second count signal CNT<2> may be initialized as a value of '0' before the count signal CNT<1:2> is sequentially counted in response to the refresh signal REF.

The decoder 2200 may decode the count signal CNT<1:2> to generate the first decoded signal DEC<1> having a logic "high" level.

At a seventh timing "T7", the command decoder 210 of the control circuit 21 may decode the command/address signal CA<1:N> to generate the refresh signal REF.

The counter 2100 may generate the count signal CNT<1:2> that is sequentially counted in response to the refresh signal REF. In such a case, the count signal CNT<1:2> may be determined to have a value of '1'. In the count signal CNT<1:2>, the value of '1' may indicate that the count signal CNT<1:2> is counted up once.

The decoder 2200 may decode the count signal CNT<1:2> to generate the second decoded signal DEC<2> having a logic "high" level.

The mode signal generation circuit 2300 may generate the mode signal ECS_MODE from the second decoded signal DEC<2> in response to the second error scrub control signal ECS_2 enabled to have a logic "high(H)" level.

The storage circuit 2400 may output the scrub address ESADD<1:M> in response to the mode signal ECS_MODE.

The internal address generation circuit 230 may output the scrub address ESADD<1:M> as the internal address IADD<1:M> in response to the mode signal ECS_MODE and the refresh signal REF.

The memory area 22 may output the internal data ID stored therein, according to the internal address IADD<1:M> during the error scrub operation while the refresh operation is performed.

The data I/O circuit 310 may output the internal data ID outputted from the memory area 22 as the input data DIN in response to the mode signal ECS_MODE.

The detection signal generation circuit 320 may detect an error in the input data DIN to generate the detection signal DET.

The data correction circuit 330 may correct an error in the input data DIN to output the corrected input data as the corrected data CD, in response to the detection signal DET.

The data I/O circuit 310 may output the corrected data CD obtained by correcting the error of the input data DIN as the internal data ID in response to the mode signal ECS_MODE.

The memory area 22 may store the internal data ID corresponding to the corrected data CD according to the internal address IADD<1:M>.

At an eighth timing "T8", the command decoder 210 of the control circuit 21 may decode the command/address signal CA<1:N> to generate the refresh signal REF.

The counter 2100 may generate the count signal CNT<1:2> that is sequentially counted in response to the refresh signal REF. In such a case, the count signal CNT<1:2> may be determined to have a value of '2' indicating that the count signal CNT<1:2> is counted up twice.

The decoder 2200 may decode the count signal CNT<1:2> to generate the third decoded signal DEC<3> having a logic "high" level.

At a ninth timing "T9", the command decoder 210 of the control circuit 21 may decode the command/address signal CA<1:N> to generate the refresh signal REF.

The counter 2100 may generate the count signal CNT<1:2> that is sequentially counted in response to the refresh signal REF. In such a case, the count signal CNT<1:2> may be determined to have a value of '3' indicating that the count signal CNT<1:2> is counted up three times.

The decoder 2200 may decode the count signal CNT<1:2> to generate the fourth decoded signal DEC<4> having a logic "high" level.

The mode signal generation circuit 2300 may generate the mode signal ECS_MODE from the fourth decoded signal DEC<4> in response to the second error scrub control signal ECS_2 enabled to have a logic "high(H)" level.

The storage circuit 2400 may output the scrub address ESADD<1:M> in response to the mode signal ECS_MODE.

The internal address generation circuit 230 may output the scrub address ESADD<1:M> as the internal address IADD<1:M> in response to the mode signal ECS_MODE and the refresh signal REF.

The memory area 22 may output the internal data ID stored therein, according to the internal address IADD<1:M> during the error scrub operation while the refresh operation is performed.

The data I/O circuit 310 may output the internal data ID outputted from the memory area 22 as the input data DIN in response to the mode signal ECS_MODE.

The detection signal generation circuit 320 may detect an error in the input data DIN to generate the detection signal DET.

The data correction circuit 330 may correct an error in the input data DIN to output the corrected input data as the corrected data CD, in response to the detection signal DET.

The data I/O circuit 310 may correct the error of the input data DIN as the internal data ID in response to the mode signal ECS_MODE to output the corrected data CD.

The memory area 22 may store the internal data ID corresponding to the corrected data CD according to the internal address IADD<1:M>.

As described above, a period between the seventh timing "T7" and the ninth timing "T9" may be a cycle time that the fourth decoded signal DEC<4> is generated after the second decoded signal DEC<2> is regenerated, which is considered the second cycle. Thus, the error scrub operation may be executed once while the refresh operation is performed twice.

As such, a semiconductor system according to an embodiment of the present invention may efficiently perform an error scrub operation by adjusting a cycle time of the error scrub operation according to the number of times that a data error occurs during a refresh operation. In addition, the semiconductor system may avoid performance degradation by adjusting a cycle time of the error scrub operation according to the number of times that a data error occurs during a refresh operation.

Figure 11:
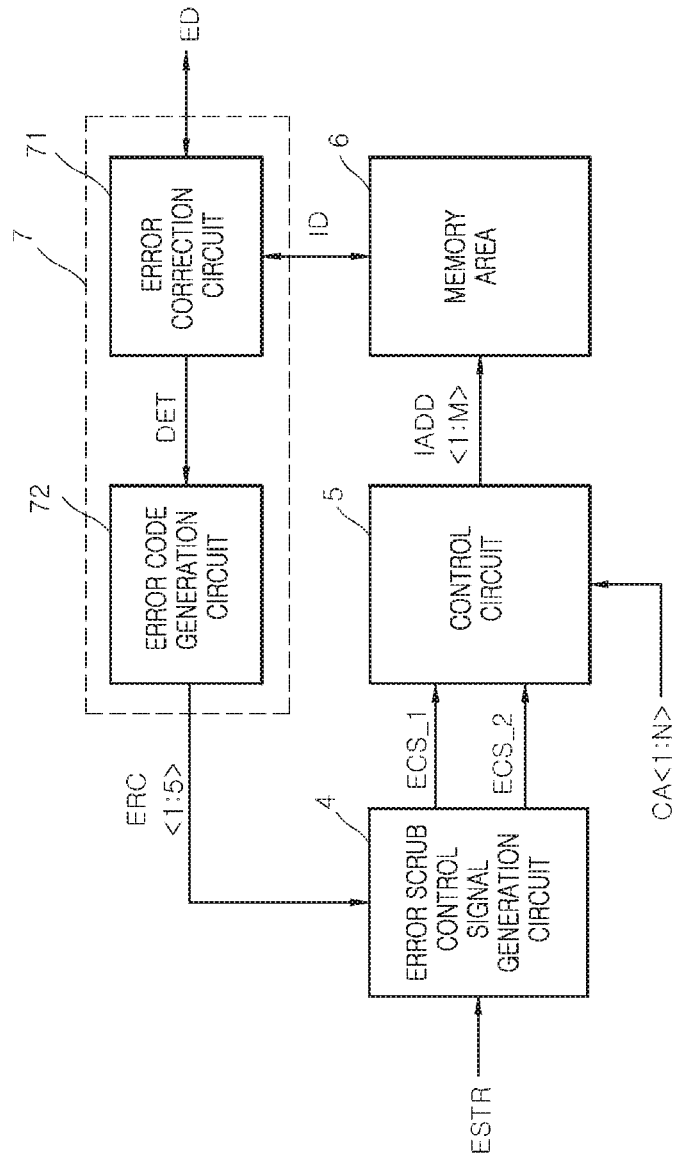
FIG. 11 is a block diagram illustrating a configuration of a semiconductor device according to another embodiment of the disclosure.

As illustrated in FIG. 11, a semiconductor device according to an embodiment may include an error scrub control signal generation circuit 4, a control circuit 5, a memory area 6 and an error detection circuit 7.

The error scrub control signal generation circuit 4 may generate a first error scrub control signal ECS_1 which is enabled in response to an error scrub entry signal ESTR when the counted number of an error code ERC<1:5> including five bits is equal to or less than a predetermined number. The error scrub control signal generation circuit 11 may generate a second error scrub control signal ECS_2 which is enabled in response to an error scrub entry signal ESTR when the counted number of times of the error code ERC<1:5> is greater than the predetermined count number of times. The error scrub control signal generation circuit 4 may generate the first error scrub control signal ECS_1 and the second error scrub control signal ECS_2, one of which is selectively enabled according to a logic level combination of the error code ERC<1:5>. The error code ERC<1:5> may include information regarding the error occurrences. Although the present embodiment is described in conjunction with the error code ERC<1:5> having five bits, the number of bits included in the error code may be determined differently according to various embodiments. When one of the first error scrub control signal ECS_1 and the second error scrub control signal ECS_2 is enabled, the other of the first error scrub control signal ECS_1 and the second error scrub control signal ECS_2 may be disabled. The error scrub control signal generation circuit 4 may be implemented to have a substantially similar configuration as the error scrub control signal generation circuit 11 illustrated in FIG. 2 to perform the same operation as the error scrub control signal generation circuit 11. Thus, a detailed description of the error scrub control signal generation circuit 4 will be omitted hereinafter. The error scrub control signal generation circuit 4 may be disposed in the semiconductor device including the memory area 6, unlike the error scrub control signal generation circuit 11 illustrated in FIG. 2.

The control circuit 5 may generate an internal address IADD<1:M> from a command/address signal CA<1:N> on a first cycle in response to the first error scrub control signal ECS_1 while a refresh operation is performed. The control circuit 5 may generate the internal address IADD<1:M> from the command/address signal CA<1:N> on a second cycle in response to the second error scrub control signal ECS_2 while the refresh operation is performed. The control circuit 5 may be implemented to have a substantially similar configuration as the control circuit 21 illustrated in FIG. 5 to perform the same operation as the control circuit 21. Thus, a detailed description of the control circuit 5 will be omitted hereinafter.

The memory area 6 may store internal data ID whose error is corrected according to the internal address IADD<1:M> after the internal data ID stored in the memory area 6 are outputted according to the internal address IADD<1:M>, during the error scrub operation while the refresh operation is performed. The memory area 22 may store the internal data ID according to the internal address IADD<1:M> during a write operation. The memory area 22 may output the internal data ID stored therein during a read operation.

The error detection circuit 7 may include an error correction circuit 71 and an error code generation circuit 72.

The error correction circuit 71 may check the internal data ID for errors and may generate a detection signal DET during the error scrub operation. The error correction circuit 71 may correct the errors of the internal data ID to output the corrected internal data to the memory area 6 during the error scrub operation. The error correction circuit 71 may output the internal data ID as external data ED during the read operation. The error correction circuit 71 may output the external data ED as the internal data ID during the write operation. The error correction circuit 71 may be implemented in a substantially similar configuration with the error correction circuit 31 illustrated in FIG. 8 to perform the same operation as the error correction circuit 31. Thus, a detailed description of the error correction circuit 71 will be omitted hereinafter.

The error code generation circuit 72 may generate the error code ERC<1:5> that is counted in response to the detection signal DET. The error code generation circuit 72 may generate the error code ERC<1:5> that is sequentially counted up when the detection signal DET is generated. The error code generation circuit 72 may be implemented to have a substantially similar configuration as the error code generation circuit 32 illustrated in FIG. 9 to perform the same operation as the error code generation circuit 32. Thus, a detailed description of the error code generation circuit 72 will be omitted hereinafter.

As such, the error detection circuit 7 may detect errors included in the internal data ID outputted from the memory area 6 and correct the errors of the internal data ID during the error scrub operation while the refresh operation is performed. When the internal data ID outputted from the memory area 6 include an error, the error detection circuit 7 may correct the error of the internal data ID and generate the error code ERC<1:5> that is counted.

As described above, an exemplary semiconductor device may efficiently perform an error scrub operation by adjusting a cycle time of the error scrub operation according to error occurrences, i.e., the number of times that a data error occurs during a refresh operation.

Figure 12:
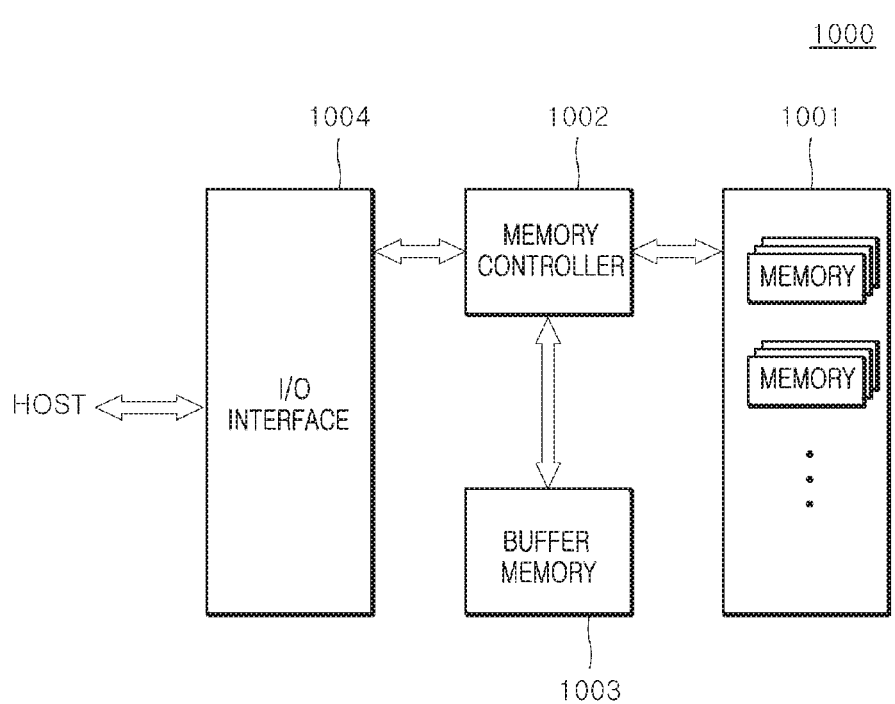
FIG. 12 is a block diagram illustrating a configuration of an electronic system employing at least one of the semiconductor system and the semiconductor device shown in FIGS. 1 to 11.

The semiconductor system or the semiconductor device described with reference to FIGS. 1 to 11 may be applied to any electronic system that includes a memory system, a graphic system, a computing system, a mobile system, or the like. By the way of example but not limitation, as illustrated in FIG. 12, an electronic system 1000 according to an embodiment may include a data storage circuit 1001, a memory controller 1002, a buffer memory 1003, and an input/output (I/O) interface 1004.

The data storage circuit 1001 may either store data delivered from the memory controller 1002 or read and output the stored data to the memory controller 1002, responsive to a control signal received from the memory controller 1002. The data storage circuit 1001 may include the second semiconductor device 2 illustrated in FIG. 1 or the semiconductor device illustrated in FIG. 11. Meanwhile, the data storage circuit 1001 may include a nonvolatile memory that can retain their stored data even when its power supply is interrupted or a power is not supplied. The nonvolatile memory may be a flash memory such as a NOR-type flash memory or a NAND-type flash memory, a phase change random access memory (PRAM), a resistive random-access memory (RRAM), a spin transfer torque random-access memory (STTRAM), a magnetic random-access memory (MRAM), or the like.

The memory controller 1002 may receive a command delivered from an external device (e.g., a host) through the I/O interface 1004 and decode the command outputted from the host device to control operations for either inputting data into the data storage circuit 1001 and the buffer memory 1003, or outputting the data stored in the data storage circuit 1001 and the buffer memory 1003. The memory controller 1002 may include the first semiconductor device 1 illustrated in FIG. 1. Although FIG. 12 illustrates the memory controller 1002 with a single unit or module, the memory controller 1002 may include plural controllers, e.g., one controller for controlling the data storage circuit 1001 including a nonvolatile memory and another controller for controlling the buffer memory 1003 including a volatile memory.

The buffer memory 1003 may temporarily store the data handled by the memory controller 1002. That is, the buffer memory 1003 may temporarily store the data outputted from or to be inputted to the data storage circuit 1001. The buffer memory 1003 may store the data, delivered from the memory controller 1002, according to a control signal. The buffer memory 1003 may read and output the stored data to the memory controller 1002. The buffer memory 1003 may include a volatile memory such as a dynamic random-access memory (DRAM), a mobile DRAM, a static random-access memory (SRAM), or the like.

The I/O interface 1004 may physically and electrically connect the memory controller 1002 to the external device i.e., a host, HOST. Thus, the memory controller 1002 may receive control signals and data from the external device (i.e., the host) through the I/O interface 1004, and output the data outputted from the memory controller 1002 to the external device (i.e., the host) through the I/O interface 1004. That is, the electronic system 1000 may communicate with the host through the I/O interface 1004. The I/O interface 1004 may be designed or utilized for any one of various interface protocols such as a universal serial bus (USB), a multi-media card (MMC), a peripheral component interconnect-express (PCI-E), a serial attached SCSI (SAS), a serial AT attachment (SATA), a parallel AT attachment (PATA), a small computer system interface (SCSI), an enhanced small device interface (ESDI) and an integrated drive electronics (IDE).

The electronic system 1000 may be used as an auxiliary storage device of the host or an external storage device. The electronic system 1000 may include a solid-state disk (SSD), a USB memory, a secure digital (SD) card, a mini secure digital (mSD) card, a micro secure digital (micro SD) card, a secure digital high capacity (SDHC) card, a memory stick card, a smart media (SM) card, a multi-media card (MMC), an embedded multi-media card (eMMC), a compact flash (CF) card, or the like.

Figure 13:
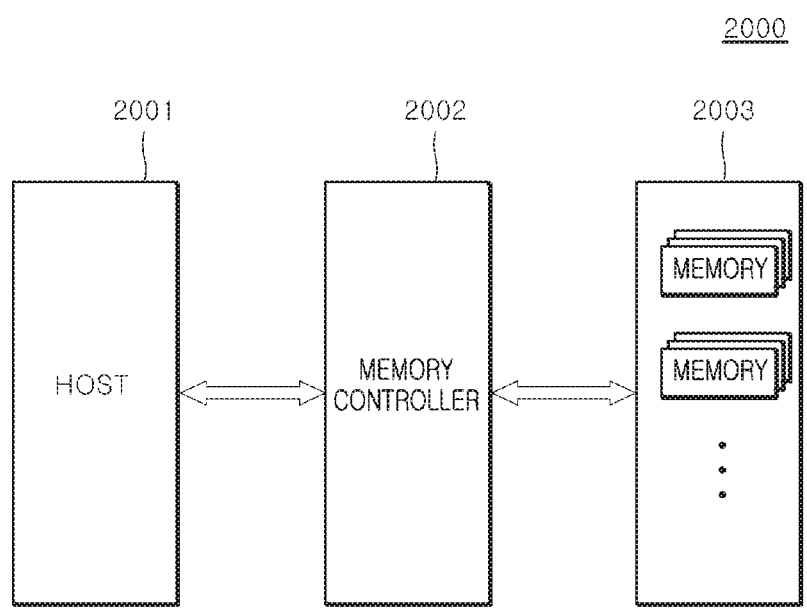
FIG. 13 is a block diagram illustrating a configuration of another electronic system employing at least one of the semiconductor system and the semiconductor device shown in FIGS. 1 to 11.

Referring to FIG. 13, an electronic system 2000 according to another embodiment may include a host 2001, a memory controller 2002 and a data storage circuit 2003.

The host 2001 may output a request signal and data to the memory controller 2002 to access the data storage circuit 2003. The memory controller 2002 may supply the data, a data strobe signal, a command, an address and a clock signal to the data storage circuit 2003 in response to the request signal, and the data storage circuit 2003 may execute a write operation or a read operation in response to the command. The host 2001 may transmit the data to the memory controller 2002 to write the data into the data storage circuit 2003. In addition, the host 2001 may receive the data from the data storage circuit 2003 through the memory controller 2002. The host 2001 may include a circuit configured to use an error correction code (ECC) scheme to correct data errors.

The memory controller 2002 may act as an interface that connects the host 2001 to the data storage circuit 2003 for communication between the host 2001 and the data storage circuit 2003. The memory controller 2002 may receive the request signal and the data from the host 2001 and may generate and supply the data, the data strobe signal, the command, the address and the clock signal to the data storage circuit 2003 for controlling operations of the data storage circuit 2003. In addition, the memory controller 2002 may supply data outputted from the data storage circuit 2003 to the host 2001. The memory controller 2002 may include the first semiconductor device 1 illustrated in FIG. 1.

The data storage circuit 2003 may include a plurality of memories. The data storage circuit 2003 may receive the data, the data strobe signal, the command, the address and the clock signal from the memory controller 2002 for executing the write operation or the read operation. Each of the memories included in the data storage circuit 2003 may include a circuit that corrects the errors of the data using an error correction code (ECC) scheme. The data storage circuit 2003 may include the second semiconductor device 2 illustrated in FIG. 1 or the semiconductor device illustrated in FIG. 11.

In some embodiments, the electronic system 2000 may be implemented to selectively operate one of the ECC circuits included in the host 2001 and the data storage circuit 2003. Alternatively, the electronic system 2000 may be implemented to simultaneously operate all of the ECC circuits included in the host 2001 and the data storage circuit 2003. By the way of example but not limitation, the host 2001 and the memory controller 2002 may be implemented in a single chip. The memory controller 2002 and the data storage circuit 2003 may be implemented in a single chip.

While the disclosure has been described in connection with what is presently considered to be the most practical and preferred example, it is to be understood that the invention is not to be limited to the disclosed examples but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A semiconductor system comprising:
a first semiconductor device configured to generate a first error scrub control signal and a second error scrub control signal according to a logic level of an error code; and
a second semiconductor device configured to perform an error scrub operation of a memory area on a first cycle time in response to the first error scrub control signal during a refresh operation and configured to perform the error scrub operation of the memory area on a second cycle time in response to the second error scrub control signal during the refresh operation.

2. The semiconductor system of claim 1, wherein the error scrub operation corrects an error of internal data stored in the memory area and restores the corrected internal data into the memory area.

3. The semiconductor system of claim 1, wherein the first semiconductor device is configured to output an error scrub entry signal for activating the error scrub operation and a command/address signal, and to receive or output external data.

4. The semiconductor system of claim 1,
wherein the first semiconductor device is configured to include an error scrub control signal generation circuit; and
wherein the error scrub control signal generation circuit is configured to generate the first error scrub control signal and the second error scrub control signal according to counted number of the error code.

5. The semiconductor system of claim 4, wherein the error scrub control signal generation circuit includes:
a comparison circuit configured to compare the error code with a comparison code including a predetermined number to generate a comparison signal; and an error scrub control signal output circuit configured to output the first error scrub control signal and the second error scrub control signal in response to an error scrub entry signal and the comparison signal.

6. The semiconductor system of claim 1, wherein the second semiconductor device includes:
a control circuit configured to generate internal address from a command/address signal on the first cycle time in response to the first error scrub control signal during the refresh operation and configured to generate the internal address from the command/address signal on the second cycle time in response to the second error scrub control signal during the refresh operation;
the memory area configured to store internal data or to output the stored internal data according to the internal address; and
an error detection circuit configured to detect an error included in the internal data outputted from the memory area during the error scrub operation while the refresh operation is performed, and to generate the error code that is counted when the error of the internal data outputted from the memory area is detected.

7. The semiconductor system of claim 6, wherein the control circuit includes:
an error scrub control circuit configured to generate a mode signal according to an input number of times of a refresh signal in response to the first error scrub control signal and the second error scrub control signal, and to output a scrub address according to the input number of times of the refresh signal in response to the first error scrub control signal and the second error scrub control signal; and
an internal address generation circuit configured to output at least one of the command/address signal and the scrub address as the internal address in response to the mode signal and the refresh signal or configured to count the internal address in response to the mode signal and the refresh signal.

8. The semiconductor system of claim 6, wherein the error detection circuit includes:
an error correction circuit configured to detect an error of the internal data to generate a detection signal during the error scrub operation; to correct the error of the internal data during the error scrub operation, to output the internal data as external data during a read operation, and to output the external data as the internal data during a write operation; and
an error code generation circuit configured to generate the error code that is counted in response to the detection signal.

9. The semiconductor system of claim 8, wherein the error correction circuit includes:
a data input/output (I/O) circuit configured to output the internal data outputted from the memory area as input data in response to a mode signal, to output corrected data obtained by correcting an error in the input data as the internal data in response to the mode signal, to output the internal data as the external data during the read operation in response to the mode signal, and to output the external data as the internal data during the write operation in response to the mode signal;
a detection signal generation circuit configured to detect an error in the input data to generate the detection signal; and
a data correction circuit configured to correct an error in the input data to output the corrected input data as corrected data, in response to the detection signal.

10. A semiconductor device comprising:
an error detection circuit configured to detect an error included in internal data outputted from a memory area to generate an error code that is counted when the error of the internal data is detected, during a refresh operation;
an error scrub control signal generation circuit configured to generate a first error scrub control signal and a second error scrub control signal according to a logic level combination of the error code; and
a control circuit configured to perform an error scrub operation on a first cycle iii response to the first error scrub control signal, and to perform the error scrub operation on a second cycle in response to the second error scrub control signal.

11. The semiconductor device of claim 10, wherein the error scrub operation corrects an error of the internal data stored in the memory area and restores the corrected internal data into the memory area.

12. The semiconductor device of claim 10, wherein the first cycle lasts "2×N" times longer than the second cycle (where, "N" denotes a natural number).

13. The semiconductor device of claim 10,
wherein the first error scrub control signal is enabled when number of times that an error of the internal data occurs is equal to or less than a predetermined number of times; and
wherein the second error scrub control signal is enabled when the number of times that an error of the internal data occurs is greater than the predetermined number of times.

14. The semiconductor device of claim 10, wherein the error detection circuit includes:
an error correction circuit configured to detect an error of the internal data to generate a detection signal during the error scrub operation, to correct the error of the internal data during the error scrub operation, to output the internal data as external data during a read operation, and to output the external data as the internal data during a write operation; and
an error code generation circuit configured to generate the error code that is counted in response to the detection signal.

15. The semiconductor device of claim 14, wherein the error correction circuit includes:
a data input/output (I/O) circuit configured to output the internal data outputted from the memory area as input data in response to a mode signal, to output corrected data obtained by correcting an error in the input data as the internal data in response to the mode signal, to output the internal data as the external data during the read operation in response to the mode signal, and to output the external data as the internal data during the write operation in response to the mode signal;
a detection signal generation circuit configured to detect an error in the input data to generate the detection signal; and
a data correction circuit configured to correct an error in the input data to output the corrected input data as corrected data, in response to the detection signal.

16. The semiconductor device of claim 10, wherein the error scrub control signal generation circuit includes:
a comparison circuit configured to compare the error code with a comparison code including a predetermined count number of times to generate a comparison signal; and an error scrub control signal output circuit configured to output the first error scrub control signal enabled in response to an error scrub entry signal when the comparison signal is disabled, and to output the second error scrub control signal enabled in response to the error scrub entry signal when the comparison signal is enabled.

17. The semiconductor device of claim 10, wherein the control circuit includes:

an error scrub control circuit configured to generate a mode signal including pulses made on the first cycle or the second cycle according to the an input number of times of a refresh signal in response to the first and second error scrub control signals, and to output a scrub address on the first cycle or the second cycle according to the input number of times of the refresh signal in response to the first and second error scrub control signals; and an internal address generation circuit configured to output any one of a command/address signal and the scrub address as internal address in response to the mode signal and the refresh signal, or to count the internal address in response to the mode signal and the refresh signal.

18. A semiconductor device comprising:

an error detection circuit configured to determine an error code including information on an error included in internal data outputted from a memory area during a refresh operation; and a control circuit configured to adjust a cycle of an error scrub operation in response to a first error scrub control signal and a second error scrub control signal according to a logic level of the error code.

* * * * *